(12) United States Patent
De La Torre et al.

(10) Patent No.: US 7,626,837 B2
(45) Date of Patent: Dec. 1, 2009

(54) DIGITALLY CONTROLLED CURRENT-MODE SWITCHED POWER SUPPLY

(75) Inventors: Luis De La Torre, Daganzo de Arriba (ES); Fadi Saibi, Hoboken, NJ (US)

(73) Assignee: Agere Systems Inc., Allentown, PA (US)

( * ) Notice: Subject to any disclaimer, the term of this patent is extended or adjusted under 35 U.S.C. 154(b) by 281 days.

(21) Appl. No.: 11/504,377

(22) Filed: Aug. 14, 2006

(65) Prior Publication Data

US 2008/0037297 A1 Feb. 14, 2008

(51) Int. Cl.
*H02M 1/14* (2006.01)
(52) U.S. Cl. .......................................... 363/41; 363/49
(58) Field of Classification Search ... 363/21.01–21.18, 363/98, 20, 25, 26; 323/282–288, 222
See application file for complete search history.

(56) References Cited

U.S. PATENT DOCUMENTS

| | | | |
|---|---|---|---|
| 6,219,262 B1 | 4/2001 | Burgyan | |
| 6,775,164 B2 * | 8/2004 | Wong et al. | 363/147 |
| 6,809,678 B2 * | 10/2004 | Vera et al. | 341/166 |
| 7,064,290 B2 * | 6/2006 | Blankenship et al. | 219/130.51 |

OTHER PUBLICATIONS

L. Balogh, "A Practical Introduction to Digital Power Supply Control", Texas Instruments Incorporated, 2005, pp. 6-1 through 6-29. Downloaded from: http://focus.ti.com/lit/ml/slup232/slup232.pdf, Apr. 5, 2006.

L. Dixon, "Control Loop Cookbook", Texas Instruments Incorporated, 2002, pp. 5-1 through 60. Downloaded from: http://focus.ti.com/lit/ml/slup113a/slup113a.pdf, Apr. 5, 2006.

K. Kittipeerachon, et al., "Feedback Compensation Design for Switched Mode Power Supplies with a Right-Half- Plane (RHP) Zero", Power Electronics, Machines and Drives, 2004, (PEMD 2004). Second International Conference on (Conf. Publ. No. 498), pp. 236-241.

Y. F. Liu, et al., "Digital Control of Switching Power Converters", Proc. of IEEE Conference on Control Applications, Toronto, Canada, Aug. 2005, pp. 635-640.

A. Peterchev, et al., "Quantization Resolution and Limit Cycling in Digitally Controlled PWM Converters", IEEE Trans. on Power Electronics, vol. 18, No. 1, 2003, pp. 301-308.

* cited by examiner

Primary Examiner—Rajnikant B Patel
(74) Attorney, Agent, or Firm—Mendelsohn, Drucker & Associates, P.C.; David L. Cargille; Steve Mendelsohn

(57) ABSTRACT

Disclosed is a current mode switched power supply. The current mode switched power supply includes a switching element and a power stage coupled to the switching element and configured to provide, in response to the switching of the switching element, an output voltage and a feedback voltage related to the output voltage. The current mode switched power supply also includes a digital control circuit connected to the switching element to digitally control the switching of the switching element.

21 Claims, 6 Drawing Sheets

DIGITALLY CONTROLLED CURRENT-MODE SWITCHED POWER SUPPLY

BACKGROUND OF THE INVENTION

The present invention relates generally to power supplies and more specifically to switched power supplies.

Efficient and ever smaller size switched power supplies are in high demand in almost all electronics devices in a wide range of applications. For example, smaller and more efficient power supplies are needed in telecommunication and embedded system applications, Power-over-Ethernet (POE) applications, microprocessors and chipsets requiring precise and robust voltage regulation, personal computers, cellular telephones, personal digital assistants (PDAs), etc.

Switched power supplies that are controlled by a current level (e.g., flowing through a resistor) are typically based on control loops and analog components. An analog signal has a continuously varying value, with infinite resolution in both time and magnitude. Analog circuits can introduce problems. For example, analog circuit characteristics can vary with manufacturing process, operating voltage and temperature, and so can be difficult to tune. Analog circuits also tend to get hot, as the power dissipated is proportional to the voltage across the active elements multiplied by the current through them. Analog circuitry can also be sensitive to noise. Because of an analog signal's infinite resolution, any perturbation or noise on an analog signal necessarily changes the current value.

Digital control of switching power supply becomes more and more attractive. Compared with analog circuits, digital control system offers a number of advantages, such as programmability, high flexibility, fewer components, and advanced control algorithms.

The problems and benefits of digital controlled power supplies are described in more detail in "A Practical Introduction to Digital Power Supply Control" by Laszlo Balogh (2005 Texas Instruments Inc.) and in "Digital Control of Switching Power Converters" by Y. Liu et al. (Proceedings of the 2005 IEEE Conference on Control Applications), both of which are incorporated herein by reference.

Basic digitally controlled power supplies are based on the digital pulse width modulator (DPWM) architecture. A digital clock signal sets the time base to convert a duty cycle digital control word into a waveform duty cycle. This results in a drawback of digital control—the resolution of the pulse width modulation (PWM) signal. Specifically, due to the nature of the digital signal, the duty cycle generated by a DPWM can only provide discrete numbers. Therefore, the output voltage is also a discrete value.

In particular, a higher resolution requires a higher clock frequency. For a given needed resolution, the clock frequency needs to be increased if the switching frequency is to be increased. There are advantages in increasing the switching frequency as it allows a power stage with significantly smaller geometrical dimensions and at a reduced cost.

Several solutions have been proposed to increase the effective resolution without necessarily increasing the digital clock in the case of a DPWM-based architecture. These include (1) fast clock counter comparator, (2) dither method, (3) tapped delay line and (4) ring oscillator.

FIG. 1A shows the structure of a fast clock counter-comparator circuit 100. In this integrated circuit (IC), the reference voltage and feedback output voltage are converted to equivalent pulse signals separately. In every sampling period, a digital proportional-integral-derivative (PID) controller 104 samples these two pulse signals. A system counter 108 is used to generate the fixed sampling period and saw-tooth switching waveform. By comparing the saw-tooth waveform and the numerical duty cycle value, the switch of converter 112 is turned on/off.

In this circuit, however, a very high frequency clock frequency and other related fast logic circuits are needed to achieve sufficient DPWM resolution at high switching frequency. Therefore, the power consumption is very high. In addition, in multiphase applications, this circuit cannot be easily shared among phases, so independent counter-comparator pair is needed for each phase. This increases the die area and power consumption even further.

The second technique is using dither methods. By using dither methods, the least significant bit (LSB) of the duty cycle is alternating between 0 and 1 in a specific pattern during the steady state operation. As a result, the effective resolution of DPWM is increased.

FIG. 1B shows a dither generation scheme based on a look-up table 116. In the proposed look-up table 116, $2^M$ dither sequences are stored for the M LSBs of the duty cycle value. Each sequence is M bit long. By selecting the dither sequence corresponding to the appropriate M LSB's value, M bit counter sweeps through this dither sequence. By using this dither pattern, the effective DPWM resolution is increased by M bits.

By using dither methods, however, sub-harmonics may occur, with frequency lower than the switching frequency. This may cause electromagnetic interference (EMI) problems during the operation and an audible noise from magnetic components.

Tapped delay line techniques have also been used to achieve high resolution DPWM. The essential components of the tapped delay line DPWM circuit are the delay line 120 and multiplexer 124, as shown in FIG. 1C.

A pulse from a reference clock 128 starts a cycle and sets the DPWM output to go high. The reference pulse propagates through the delay line 120, and when it reaches the output selected by the multiplexer 124, the DPWM output 132 goes low. The total delay of the delay line 120 is adjusted to match the reference clock period.

A disadvantage of this method, however, is that the size of the multiplexer 124 increases exponentially with the number of resolution bits. Another drawback is that when this technique is applied to multiphase applications, precise delay matching among the phases places a stringent symmetry requirement on the delay line 120. Also, the delay line 120 is an analog circuit element and is not area efficient for high resolutions.

Another solution is using a ring oscillator 136, as shown in FIG. 1D. The above configuration is composed of 128 stage differential ring oscillators, which yield 256 symmetrically oriented taps, and a 256-4 multiplexer (MUX) 140 that can select the appropriate signals from the ring. During the operation, a square wave propagates along the ring. When the rising edge reaches tap zero in the ring, the rising edge of the PWM signal for phase one is generated. The falling edge of this PWM signal is generated when the rising edge of the propagating square wave reaches a specified tap in the ring. This scheme has the advantage of symmetric structure and is therefore suitable for multiphase applications. This scheme, however, has similar area inefficiencies as the delay line.

Therefore, there remains a need to overcome the inherent problems associated with analog components of a power supply as well as the inherent problems associated with digital control power supplies.

BRIEF SUMMARY OF THE INVENTION

A digitally controlled current-mode power supply architecture leverages the advantages of digital control over analog control but frees itself from the constraints of the DPWM-based architecture. In accordance with an embodiment of the present invention, a current mode switched power supply is digitally controlled. The current mode switched power supply includes a switching element (e.g., a transistor) and a power stage coupled to the switching element and configured to provide, in response to the switching of the switching element, an output voltage and a feedback voltage related to the output voltage. The current mode switched power supply also includes a digital control circuit having a difference circuit, a converter, and a comparator. The difference circuit is configured to produce an error voltage from the feedback voltage. The converter is configured to convert the error voltage to a peak current threshold value. The comparator is configured to compare the peak current threshold value to a voltage representing the current through a resistor coupled to the switching element.

Various embodiments of the invention are described below. The current mode switched power supply can additionally include a voltage feedback circuit and a current sense circuit in communication with the digital control circuit. The voltage feedback circuit is configured to convert the feedback voltage to a digital feedback voltage. The current sense circuit is configured to provide the digital control circuit with an over current signal.

The switching element is configured to be in an "off" state when the over current signal has a value of "1". The switching element is configured to be in an "on" state when the over current signal has a value of "0". In one embodiment, the switching element is configured to be in an "on" state when a clock signal is high. The switching element is configured to be in an "off" state when the over current signal has a value of "1" after a programmable blanking delay time. In one embodiment, the switching element is configured to be in an "off" state when the over current signal has a value of "0" or after a programmable delay time representing a maximum duty cycle, which is greater than the programmable blanking delay time.

The digital control circuit can also include a pulse width modulator for providing an output signal for controlling the switching element. The digital control circuit includes a clocking and duty cycle boundary control coupled to the pulse width modulator for resetting the pulse width modulator. The digital control circuit also includes a digital loop filter configured to receive programmable filter parameter values and the error voltage.

These and other advantages of the invention will be apparent to those of ordinary skill in the art by reference to the following detailed description and the accompanying drawings.

DETAILED DESCRIPTION

Conventional current mode control circuits result in unique waveforms which can interfere with proper regulation of the output voltage in switching power supplies. A typical current mode control circuit commonly used in switching power supplies is represented by the block diagram circuit of FIG. 1E. In general, current through an inductive load coupled to a power transistor is used for current mode control and cycle-by-cycle current limiting. The current mode control circuit has a voltage feedback loop 144 and a current-sense feedback loop 152 which work together to provide a regulated output voltage at $V_{out}$ 154. However, a gate charge current pulse ($I_{charge}$) 156 alters the leading edge of a current-sense waveform causing erroneous response in the peak current sensing feedback control circuitry and interferes with the proper regulation of the output voltage $V_{out}$ 154.

Figure 1A:
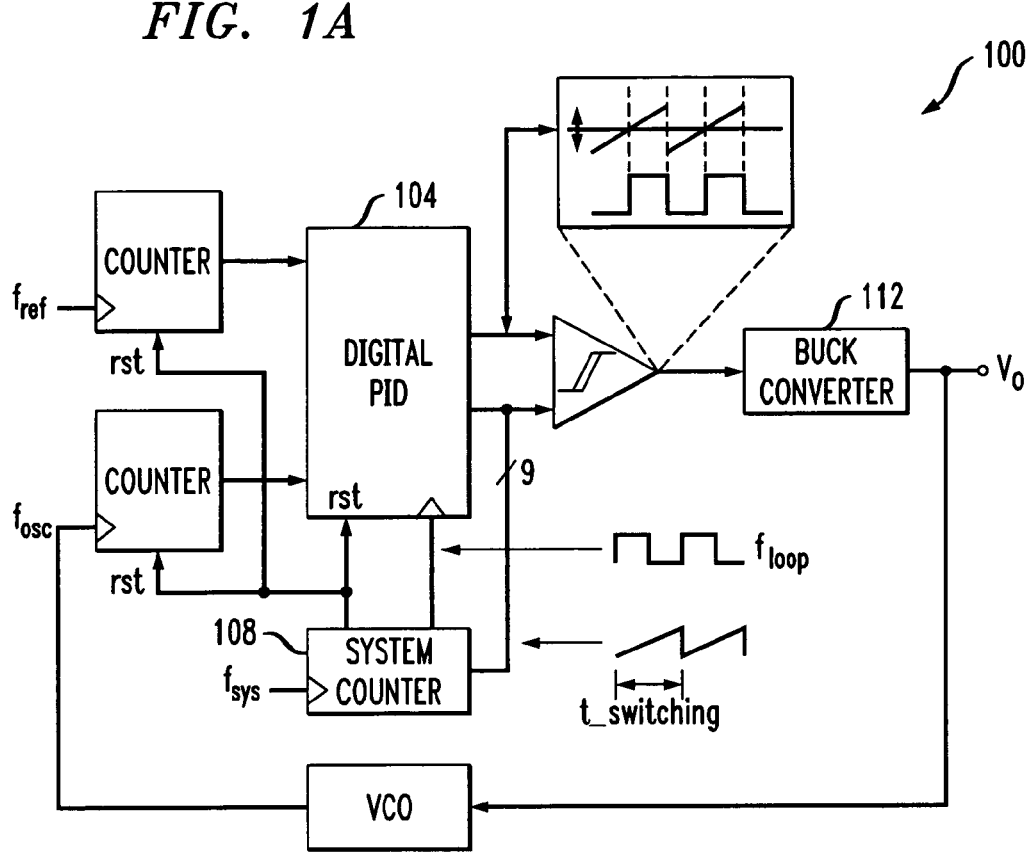
FIG. 1A is a block diagram of a digital fixed frequency counter-comparator circuit.
Figure 1B:
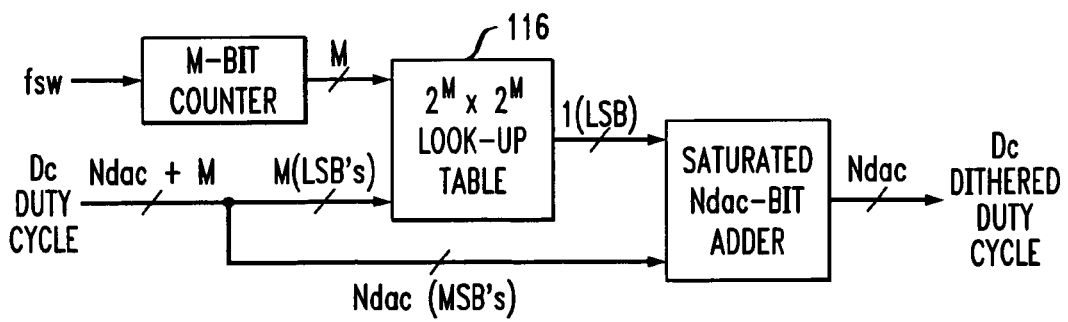
FIG. 1B is a block diagram of arbitrary dither patterns.
Figure 1C:
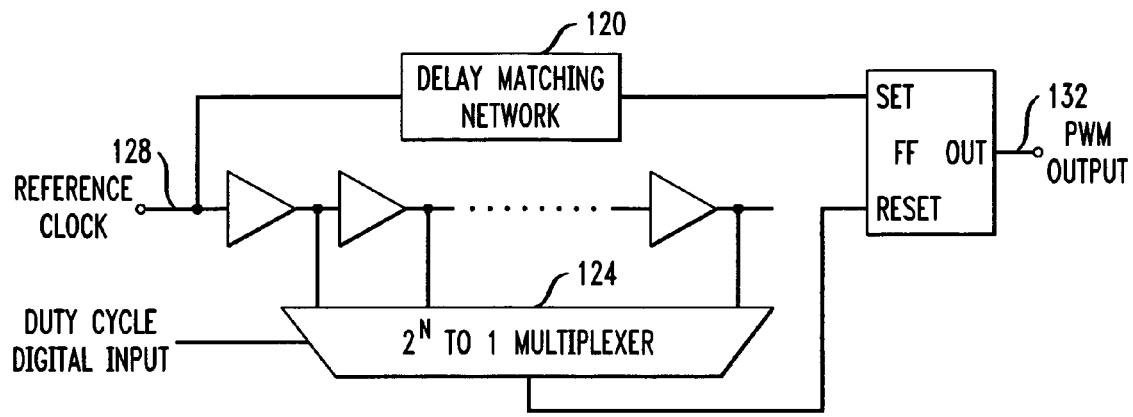
FIG. 1C is a block diagram of a DPWM circuit using a tapped delay line.
Figure 1D:
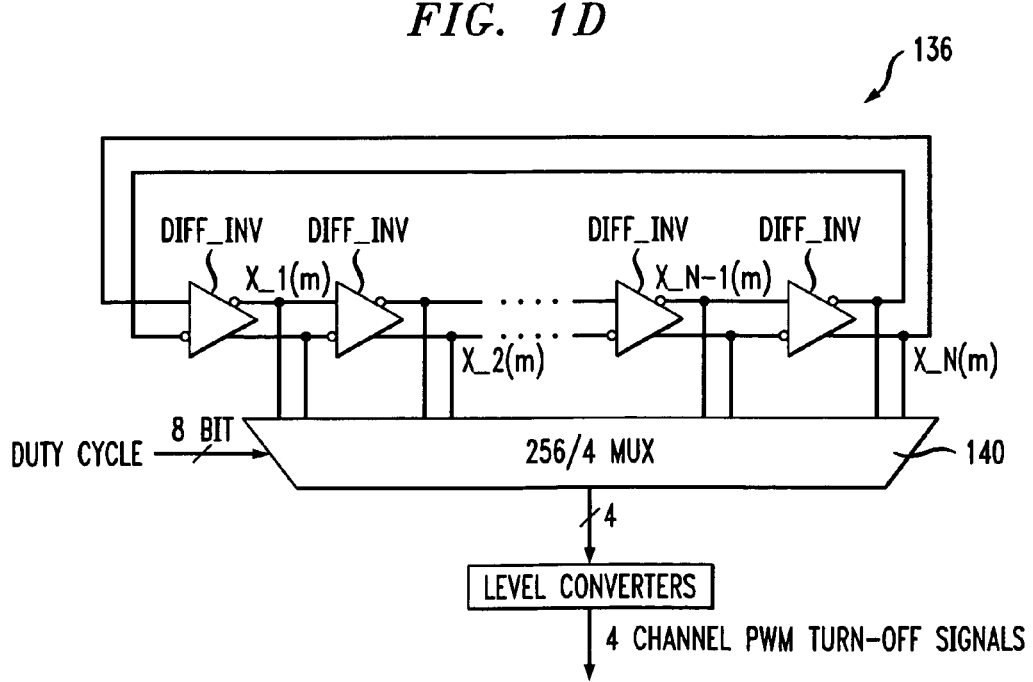
FIG. 1D is a block diagram of a DPWM circuit using a ring oscillator.
Figure 1E:
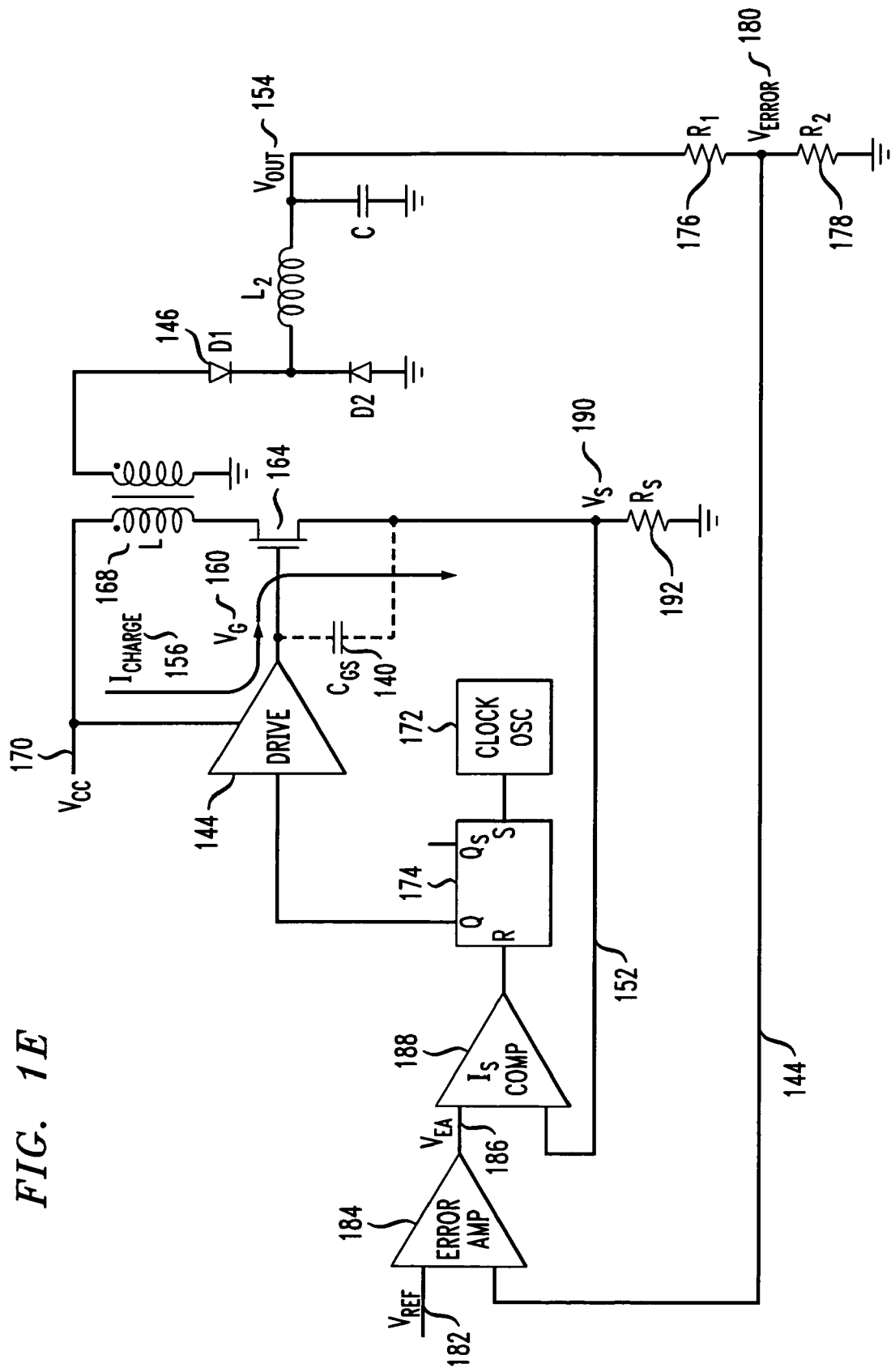
FIG. 1E is a block diagram of a current mode control circuit commonly used in switching power supplies.

In the current mode control circuit of FIG. 1E (which includes a specific example of a power stage), the voltage and current-sense feedback loops 144, 152 control the pulse width of the gate drive voltage pulse $V_g$ 160 which opens and closes the power transistor main switch 164. The main switch 164 is typically a metal oxide semiconductor field effect transistor (MOSFET) switch that, in conjunction with inductor 168, facilitates the transfer of energy from the voltage input $V_{cc}$ 170 to the voltage output $V_{out}$ 154 by opening and closing in response to the drive pulse $V_g$ 160. The width of each drive pulse $V_g$ 160 is regulated by feedback through the voltage and current-sense feedback loops 144, 152 and determines the length of time during each clock cycle that the main switch 164 remains closed in order to build up energy in the inductor L 168. The longer the switch 164 is closed, the larger the transferred energy, resulting in a larger voltage output $V_{out}$ 154. Conversely, a shorter conduction interval of switch 164 results in a lower voltage output $V_{out}$ 154. The drive pulse $V_g$ 160 is generated by a constant-frequency clock 172 driving a latch 174. The output voltage $V_{out}$ 154 is thus regulated by the constant-frequency, pulse-width modulated voltage pulse $V_g$ 160.

In operation, the voltage and current-sense feedback loops 144, 152 modulate the width of the drive pulse $V_g$ 160 as a result of monitoring the output voltage $V_{out}$ 154 and sensing the current flowing through the main switch 164. In the example current mode control circuit of FIG. 1E, 5 volts has been chosen as a typical value for $V_{out}$ 154. Resistors $R_1$ 176 and $R_2$ 178 make up a voltage divider which divides down $V_{out}$ 154 to provide a $V_{error}$ 180 voltage which is monitored within the voltage feedback loop 144. A voltage reference $V_{ref}$ 182 is set such that $V_{error}$ 180 is equal to $V_{ref}$ 182 when $V_{out}$ 154 is properly regulated to 5 volts. A typical value for $V_{ref}$ 182 is 1.25 volts, and thus the resistors $R_1$ 176 and $R_2$ 178 are selected to provide a value of 1.25 volts at $V_{error}$ 180 for a properly regulated $V_{out}$ 154 value of 5 volts. Any change in voltage at $V_{out}$ 154 results in a corresponding change in $V_{error}$ 180. The voltage difference between $V_{error}$ 180 and $V_{ref}$ 182 is then amplified by the error amplifier 184, resulting in an adjustment of the error amplifier 184 output voltage level $V_{ea}$ 186. During each clock cycle, a current-sense comparator 188 compares $V_{ea}$ 186 with the current-sense voltage $V_s$ 190, which is the voltage across a current-sense resistor $R_s$ 192 that rises as current flows through the closed main switch 164. The current-sense voltage $V_s$ 190 tracks the linearly increasing current through inductor L 168, and thus the energy being transferred from the voltage input $V_{cc}$ 170 to the voltage output $V_{out}$ 154, during each clock cycle as the main switch 164 is in a closed position due to the gate drive pulse $V_g$ 160. During each clock cycle, the gate drive pulse $V_g$ 160 keeps the main switch 164 closed until the current-sense voltage $V_s$ 190 rises to the level Of $V_{ea}$ 186, at which point the current-sense comparator 188 resets the R-S flip-flop 174 which terminates the gate drive pulse $V_g$ 160 and opens the main switch 164 until the next clock cycle begins. Thus, the current-sense comparator 188 uses the monitored output voltage $V_{out}$ 154 and the sensed current through inductor L 168 to modulate the width of the drive pulse $V_g$ 160 and regulate $V_{out}$ 154.

This circuit, however, is based on analog components. The control of the width of the drive pulse $V_g$ 160 and also $V_{out}$ 154 is performed via analog means. As a result, the circuit may inaccurately regulate these values because of the inherent inaccuracies of analog components. For example, temperature swings may result in inaccuracies of the regulation of $V_{out}$ 154.

Figure 2:
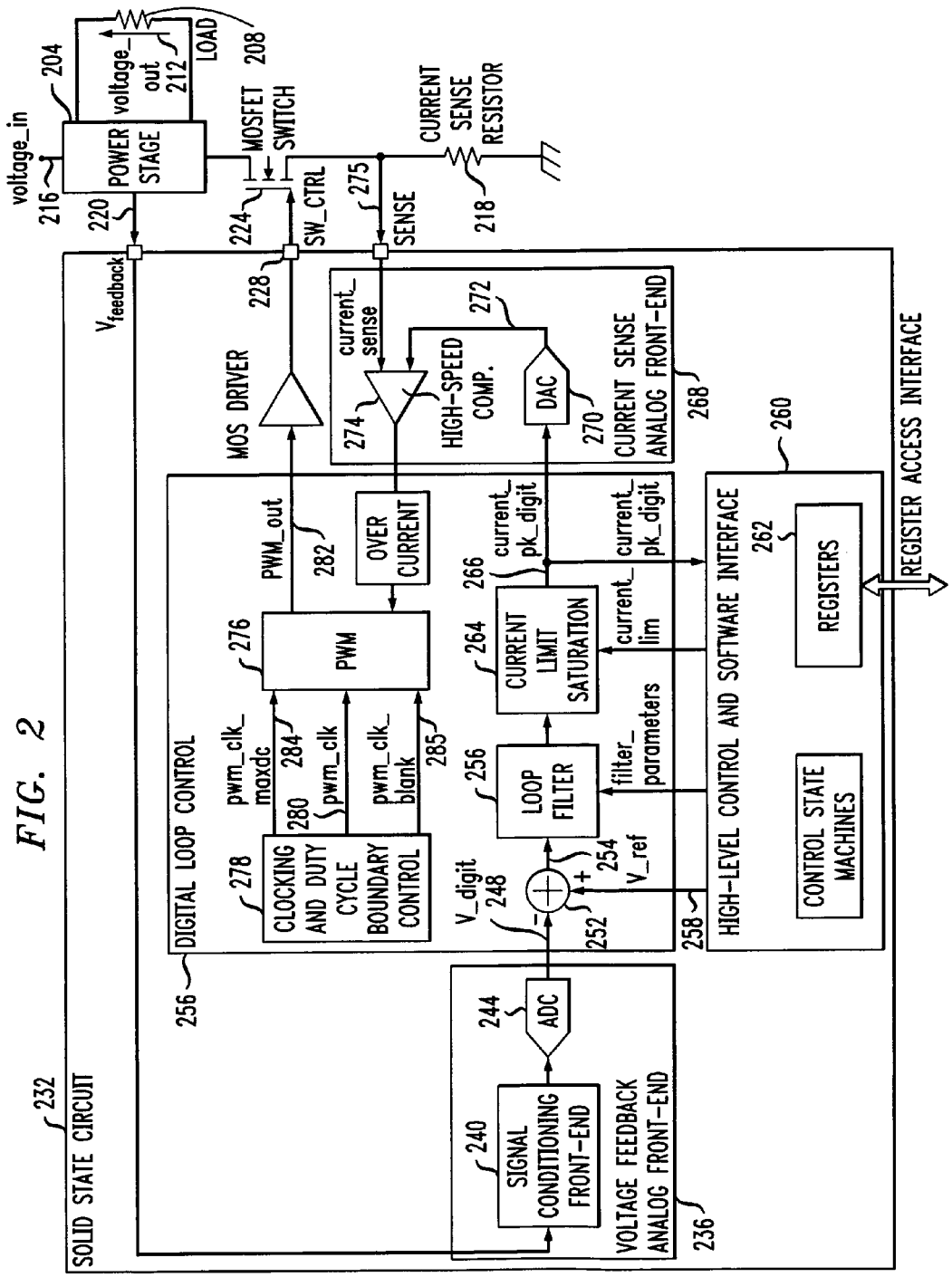
FIG. 2 is a block diagram of a digitally controlled, current-mode switched power supply in accordance with an embodiment of the present invention.

FIG. 2 shows a block diagram of an architecture in accordance with an embodiment of the present invention. The architecture overcomes challenges encountered in the design of digitally controlled switched power supplies using a high speed system clock.

FIG. 2 includes a digitally controlled, current-mode switched power supply 204 supplying power to a load 208. Output voltage 212 (shown in FIG. 2 as voltage_out) of the power supply 204 is the voltage across the load 208. An input voltage 216 is provided to the power stage 204 and the power stage 204 produces the output voltage 212 (which can be lower or higher than the input voltage 216) and a feedback voltage $V_{feedback}$ 220. Although shown with a MOSFET switch 224, any switching element (e.g., transistor, relay, switch, logic gate, etc.) can be used. The state of the MOSFET switch 224 is determined by an output SW_CTRL 228 of a solid state circuit 232.

The digital controlled switched power supply 204 is a current-mode supply. When the MOSFET 224 is turned on, current flows through current sense resistor 218. The amount of current spikes, falls, and then ramps upward.

The feedback voltage $V_{feedback}$ 220 is provided to a voltage feedback analog front-end 236 of the solid state circuit 232. The voltage feedback analog front-end 236 includes a signal conditioning front-end 240 and an analog-to-digital (ADC) converter 244. The signal conditioning front-end 240 receives the feedback voltage $V_{feedback}$ 220 and, in one embodiment, holds the voltage for a predetermined amount of time before inputting the voltage to the ADC 244. This delay enables the ADC 244 to convert the analog voltage to a digital value without experiencing variations in the analog voltage.

The output digital voltage 248 of the ADC 244 is provided to a difference circuit 252 of a digital loop control circuit 256. The difference circuit 252 subtracts the digital voltage 248 provided by the ADC 244 from a reference voltage 258. The reference voltage 258 is transmitted by a high level control and software interface 260. In one embodiment, the reference voltage 258 can be programmed in one or more registers 262 of the control and software interface 260.

The difference circuit 252 provides the result of the subtraction, also referred to as an error voltage 254, to a loop filter 256. The loop filter 256 filters (e.g., amplifies) the error voltage 254. The loop filter 256 outputs a voltage signal that is a representation of a current level. The loop filter 256 provides this output signal to a current limit saturation block 264. The current limit saturation block 264 sets a saturation limit (i.e., a maximum current) on the loop filter's output and provides a digital current signal 266 (i.e., a digital word coding for a voltage representing a peak current threshold value through the current sense resistor) to a current sense analog front-end 268 and to the control and software interface 260.

The digital current signal 266 is then converted to an analog signal (via the digital-to-analog converter (DAC) 270). The DAC 270 transmits the analog current control signal 272 to a high speed comparator 274. The high speed comparator 274 compares this signal 272 related to the feedback voltage $V_{feedback}$ with a current_sense signal 275. The current_sense signal 275 is an analog voltage signal representing the current across the current sense resistor 218.

If the current sense signal 275 is less than the analog current control signal 272, the output of the comparator 274 is a "0". If, however, the current sense signal 275 is greater than the analog current control signal 272, the output of the comparator 274 is a "1". The output of the comparator 274 is an over current signal 277 which is provided as input into a pulse width modulator (PWM) 276. The PWM 276 receives the over current signal 277 and controls the signal to enforce a minimum and maximum duty cycle at a programmable switching frequency.

The over current signal 277 shuts down the MOSFET switch 224 when the over current signal 277 is a "1" (i.e., the current sense signal 275 is greater than the analog current signal 272).

The digital loop control 256 also includes a clocking and duty cycle boundary control 278. The clocking and duty cycle boundary control 278 provides a switching clock to the PWM 276. In particular, the clocking and duty cycle boundary control 278 provides a PWM clock signal (pwm_clk) 280 to the PWM 276 to begin another PWM cycle. The PWM clock signal 280 is the clock signal that is used to generate the output waveform 282 of the PWM 276. The clock and duty cycle boundary control 278 also provides a pwm_clk_maxdc clock signal 284 and a pwm_clk_blank signal 285. The delay of the pwm_clk_maxdc clock signal 284 fixes the maximum duty cycle of the PWM output signal 282 and can force the output waveform 282 of the PWM to "0" regardless of the over current signal value.

The pwm_clk_blank signal 285 is a delayed version of the pulse width modulator clock signal (pwm_clk) 280. The delay is digitally controllable (e.g., via a register in the registers 262). The delay of the pwm_clk_blank clock signal 285 with respect to the pulse width modulator clock signal 280 prevents output waveform 282 of the PWM from going from the value "1" to the value "0" regardless of the over current signal value. Thus, if the current sense signal 275 experiences a spike at the beginning of the MOSFET switch "on" cycle, the PWM 276 will be insensitive to the resulting spurious and transient assertion of the over current signal.

Figure 3:
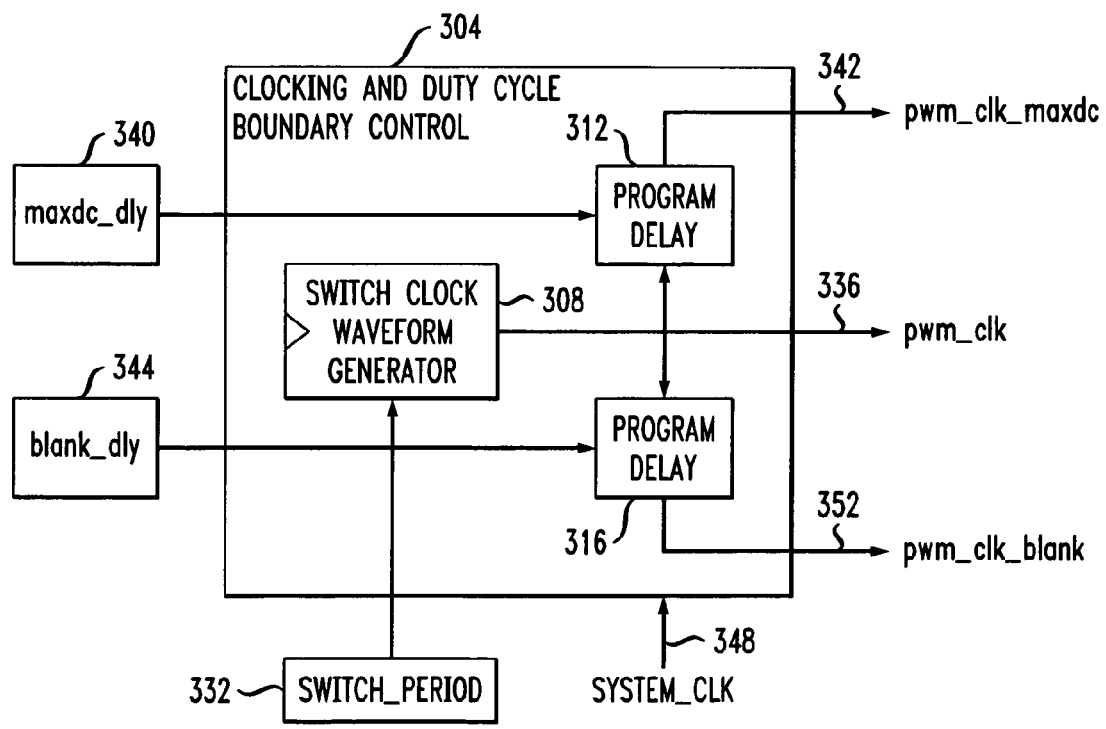
FIG. 3 is a block diagram of a clocking and duty cycle boundary control block in accordance with an embodiment of the present invention.

FIG. 3 shows a block diagram of clocking and duty cycle boundary control 304. The clocking and duty cycle boundary control 304 includes a switch clock waveform generator 308 (e.g., circuit, logic gates, transistors, etc.) and controllable delay elements 312 and 316 (e.g., circuit, logic gates, transistors, etc.).

A programmable switch_period signal 332 is provided as input to the switch clock waveform generator 308. The switch clock waveform generator 308 generates the PWM clock signal (pwm_clk) 336. The pwm_clk signal 336 has a period associated with switch_period 332. Thus, the period of the output of the PWM is programmable and based on the switch_period 332.

Further, the delay elements 312, 316 are also programmable. In particular, a maxdc_dly signal 340 is provided as input to delay element 312. The maxdc_dly signal 340 provides the maximum duty cycle control, thereby preventing the entering of a region of current mode instability, such as for flyback and boost supply architectures. The delay element 312 delays the pwm_clk signal 336 by a multiple maxdc_dly 340 of the period of system clk 348 to produce a pwm_clk_maxdc signal 342 for input into the PWM.

A blank_dly signal 344 is provided as input to the delay element 316. The blank_dly signal 344 sets the minimum duty cycle control, thus providing current pulse leading-edge blanking. The delay element 316 delays the pwm_clk signal 336 by a multiple blank_dly 344 of the period of system clk 348 to produce a pwm_clk_blank signal 352 for input into the PWM.

Figure 4:
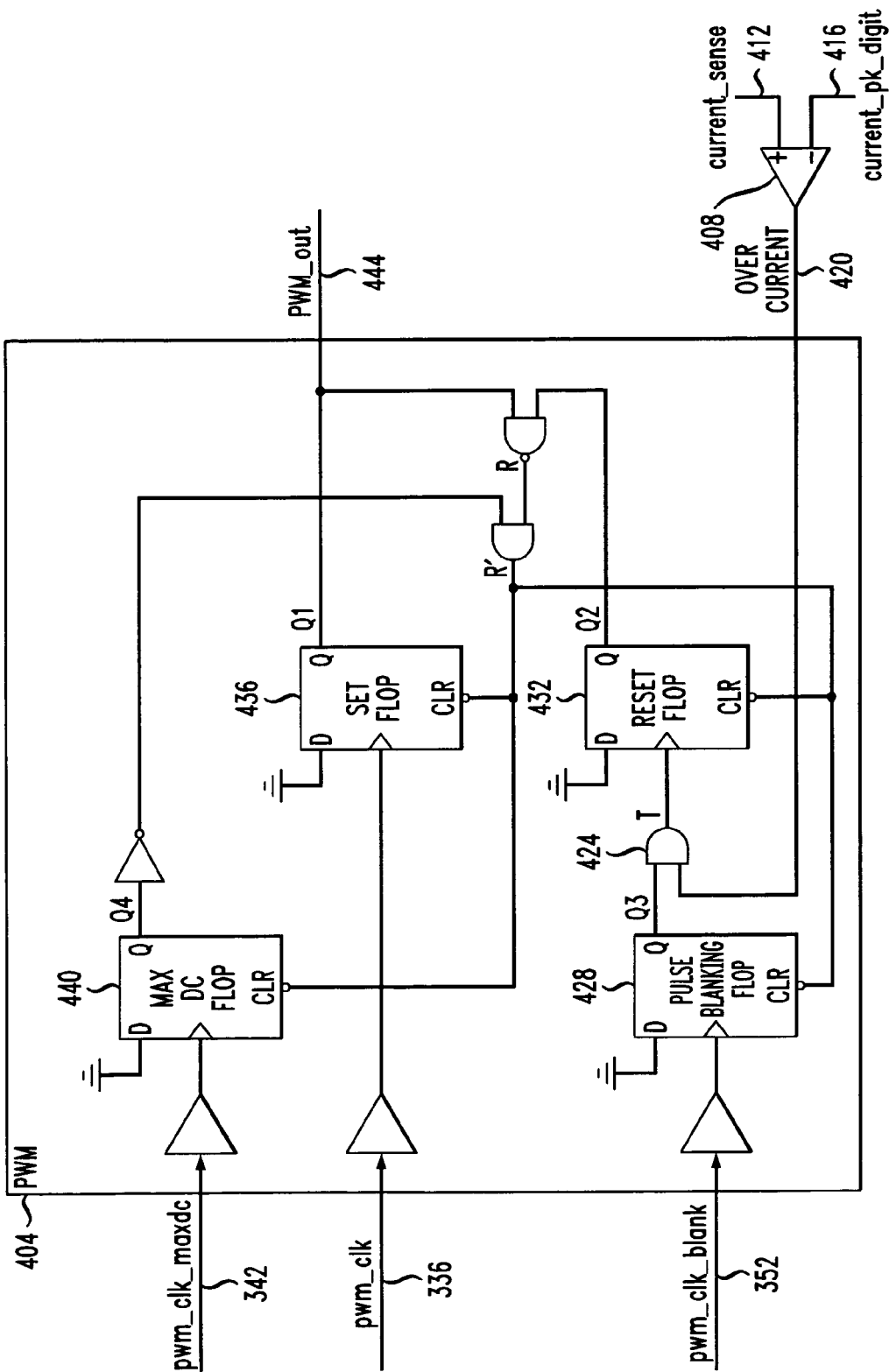
FIG. 4 is a block diagram of a pulse width modulator in accordance with an embodiment of the present invention.

FIG. 4 shows a block diagram of a PWM 404. The PWM 404 receives a digital clock and different controls to enforce a minimum and maximum duty cycle at a programmable switching frequency.

Specifically, the PWM 404 receives as input the pwm_clk_maxdc signal 342, the pwm_clk signal 336, and the pwm_clk_blank signal 352. A comparator 408 is connected to the PWM 404. As described above, the comparator 408 receives as input a current_sense signal 412 and a current_pk_digit signal 416. The current_sense signal 412 is a signal representing the current flowing through the current sense resistor (as shown in FIG. 2). The current_pk_digit 416 is a signal representing the controlled peak value of the current that can flow through the current sense resistor. The comparator 408 determines whether the current flowing through the current sense resistor is less than the current limit. If it is not, then the comparator 408 outputs a "1" to represent that there is an overcurrent. If the current_sense is less than the current limit, then the comparator 420 outputs a zero to represent that there is no overcurrent. In one embodiment, the comparator 408 is an internal component of the PWM 404.

This overcurrent value 420 is input into an AND gate 424 of the PWM 404. The pwm_clk_blank signal 452 is input into a flip flop 428 and then into the AND gate 424. The AND gate 424 produces an output which is the clocking signal for the Reset flip flop 432. The Reset flip flop 432 helps determine when to clear a Set flip flop 436 and a Max DC flip flop 440. The Set flip flop 436 receives the pwm_clk signal 336 as input and outputs a pulse width modulation PWM_out signal 444.

Thus, unlike a voltage controlled power supply controlled by the duty cycle of a pulse width modulator, the current controlled power supply described above is controlled by a digital peak current (i.e., current_pk_digit signal 416). As a result, the PWM 404 does not need a high-speed clock to control the duty cycle of the PWM output.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A current mode switched power supply comprising:
   a switching element;
   a power stage coupled to said switching element and configured to generate, in response to the switching of said switching element, an output voltage and a feedback voltage related to said output voltage; and
   a digital control circuit comprising
      a difference circuit configured to produce an error voltage from said feedback voltage;
      a converter configured to convert said error voltage to a peak current threshold value; and
      a comparator configured to compare said peak current threshold value to a voltage representing current through a resistor coupled to said switching element, wherein said digital control circuit further comprises a digital loop filter configured to receive programmable filter parameter values and said error voltage.

2. The current mode switched power supply of claim 1 comprising a voltage feedback circuit coupled to said digital control circuit and configured to convert said feedback voltage to a digital feedback voltage.

3. The current mode switched power supply of claim 1 comprising a current sense circuit in communication with said digital control circuit and configured to provide said digital control circuit with an over current signal.

4. The current mode switched power supply of claim 3 wherein said switching element is configured to be in an "off" state when said over current signal has a value of "1".

5. The current mode switched power supply of claim 3 wherein said switching element is configured to be in an "on" state when said over current signal has a value of "0".

6. The current mode switched power supply of claim 5 wherein said switching element is configured to be in an "on" state when a clock signal is high.

7. The current mode switched power supply of claim 6 wherein said switching element is configured to be in an "off" state when said over current signal has a value of "1" after a programmable blanking delay time.

8. The current mode switched power supply of claim 7 wherein said switching element is configured to be in an "off" state when said over current signal has a value of "0" or after a programmable delay time representing a maximum duty cycle occurring after a programmable delay time.

9. The current mode switched power supply of claim 1 wherein said digital control circuit further comprises a pulse width modulator configured to provide an output signal for controlling said switching element.

10. The current mode switched power supply of claim 9 wherein said digital control circuit comprises a clocking and duty cycle boundary control coupled to said pulse width modulator for resetting said pulse width modulator.

11. A method for controlling a current mode switched power supply comprising:
   switching a switching element coupled to said current mode switched power supply;
   said current mode switched power supply generating an output voltage and a feedback voltage related to said output voltage in response to said switching;
   generating an error voltage from said feedback voltage;
   converting said error voltage to a peak current threshold value; and
   comparing said peak current threshold value to a voltage representing current through a resistor coupled to said switching element, wherein said generating an error voltage further comprises calculating a difference between a programmable reference voltage and said feedback voltage.

12. The method of claim 11 further comprising digitally controlling said current mode switched power supply from said comparing.

13. The method of claim 11 further comprising performing digital filtering of said error voltage using filter parameters to produce peak current digital representation.

14. The method of claim 13 further comprising converting said peak current digital representation into voltage representing a peak current threshold value.

15. A current mode switched power supply comprising:
   means for switching a switching element coupled to said current mode switched power supply;
   means for generating an output voltage and a feedback voltage related to said output voltage in response to said switching;
   means for generating an error voltage from said feedback voltage;
   means for converting said error voltage to a peak current threshold value;
   means for comparing said peak current threshold value to a voltage representing current through a resistor coupled to said switching element; and
   means for calculating a difference between said feedback voltage and a programmable reference voltage.

16. The current mode switched power supply of claim 15 further comprising means for resetting a pulse width modulator.

17. The current mode switched power supply of claim 15 further comprising
   means for filtering said error voltage using filter parameters.

18. The current mode switched power supply of claim 15 further comprising means for setting a limit for said peak current threshold value.

19. A method for controlling a current mode switched power supply comprising:
   switching a switching element coupled to said current mode switched power supply;
   said current mode switched power supply generating an output voltage and a feedback voltage related to said output voltage in response to said switching;
   generating an error voltage from said feedback voltage;
   converting said error voltage to a peak current threshold value;
   comparing said peak current threshold value to a voltage representing current through a resistor coupled to said switching element; and
   performing digital filtering of said error voltage using filter parameters to produce peak current digital representation.

20. The method of claim 19 further comprising converting said peak current digital representation into voltage representing said peak current threshold value.

21. A current mode switched power supply comprising:
   means for switching a switching element coupled to said current mode switched power supply;
   means for generating an output voltage and a feedback voltage related to said output voltage in response to said switching;
   means for generating an error voltage from said feedback voltage;
   means for converting said error voltage to a peak current threshold value;
   means for comparing said peak current threshold value to a voltage representing current through a resistor coupled to said switching element; and
   means for filtering said error voltage using filter parameters.

* * * * *

UNITED STATES PATENT AND TRADEMARK OFFICE
CERTIFICATE OF CORRECTION

PATENT NO.       : 7,626,837 B2
APPLICATION NO.  : 11/504377
DATED            : December 1, 2009
INVENTOR(S)      : De La Torre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this

Twenty-first Day of December, 2010

David J. Kappos
*Director of the United States Patent and Trademark Office*